United States Patent
Stevens

(10) Patent No.: US 12,510,774 B2
(45) Date of Patent: Dec. 30, 2025

(54) AUTOMATIC EYEWEAR CLEANING STATION AND METHOD OF USING THE SAME

(71) Applicant: Justin Stevens, Rochester, NY (US)

(72) Inventor: Justin Stevens, Rochester, NY (US)

( * ) Notice: Subject to any disclaimer, the term of this patent is extended or adjusted under 35 U.S.C. 154(b) by 29 days.

(21) Appl. No.: 18/615,687

(22) Filed: Mar. 25, 2024

(65) Prior Publication Data

US 2025/0298264 A1    Sep. 25, 2025

(51) Int. Cl.
| | |
|---|---|
| *G02C 13/00* | (2006.01) |
| *A61L 2/18* | (2006.01) |
| *A61L 2/24* | (2006.01) |
| *A61L 2/26* | (2006.01) |
| *B08B 3/02* | (2006.01) |
| *B08B 13/00* | (2006.01) |

(52) U.S. Cl.
CPC ............ *G02C 13/006* (2013.01); *A61L 2/18* (2013.01); *A61L 2/24* (2013.01); *A61L 2/26* (2013.01); *B08B 3/02* (2013.01); *B08B 13/00* (2013.01); *A61L 2202/14* (2013.01); *A61L 2202/17* (2013.01)

(58) Field of Classification Search
CPC . G02C 13/006; A61L 2/18; A61L 2/24; A61L 2/26; A61L 2202/14; A61L 2202/17; B08B 3/02; B08B 13/00
See application file for complete search history.

(56) References Cited

U.S. PATENT DOCUMENTS

| | | | |
|---|---|---|---|
| 5,979,849 A | 11/1999 | Williams | |
| 6,821,355 B1 | 11/2004 | Taylor | |
| 6,938,628 B2 | 9/2005 | Cooley | |
| 9,298,022 B2 | 3/2016 | Myers | |
| 2016/0279680 A1 | 9/2016 | Lutz | |
| 2019/0270124 A1 | 9/2019 | Jang | |

FOREIGN PATENT DOCUMENTS

CN        117031786 A  * 11/2023  ........... G02C 13/006

OTHER PUBLICATIONS

Machine Translation of Wang et al., CN-117031786-A, Nov. 2023. (Year: 2023).*

* cited by examiner

*Primary Examiner* — David G Cormier

(57) ABSTRACT

An automatic eyewear treatment station is used to clean and disinfect eyewear, such as safety glasses, and includes a housing, a wipe compartment, a tank of cleaning or disinfecting liquid, a dispensing arrangement, and a control arrangement. The control arrangement is designed to automatically activate the dispensing arrangement when a user places the eyewear under a nozzle. The dispensing arrangement dispenses a mist of cleaning and disinfecting liquid to treat the eyewear, which then can be dried off with wipes retrieved from the wipe compartment.

12 Claims, 9 Drawing Sheets

AUTOMATIC EYEWEAR CLEANING STATION AND METHOD OF USING THE SAME

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to eyewear cleaning devices and more particularly pertains to a new automatic eyewear treatment station for cleaning or disinfecting eyewear. It should first be noted that the term "eyewear" as used in this application refers to most any kind of eyewear, such as glasses for nearsighted or shortsighted people, reading glasses, sunglasses, safety glasses and goggles, and other such eyewear. For most people, cleaning eyewear is a manual task that is useful, if not necessary, in areas where eyewear, particularly safety glasses, can be contaminated such as in the industrial or medical industries. It would therefore be advantageous to have a cleaning station that is hygienic and easy to use for quick yet thorough cleaning of safety glasses and other eyewear in industrial or medical industries or similar settings.

(2) Description of Related Art Including Information Disclosed Under 37 CFR 1.97 and 1.98

The prior art relates to eyewear cleaning devices. The prior art, as best understood, discloses very complex tools for automatically cleaning eyewear, but does not disclose a station that facilitates quick cleaning using an apparatus that is mountable in an easily accessible location to encourage the cleaning of safety glasses.

BRIEF SUMMARY OF THE INVENTION

An embodiment of the disclosure meets the needs presented above in an automatic eyewear treatment station generally comprising a housing, a wipe compartment, a tank, a dispensing arrangement, and a control arrangement. The housing is designed to be mounted to a wall or support structure with an upper housing portion positioned vertically higher than a lower housing portion. The tank is positioned in the housing and designed to store treatment media to be used by a user to clean, disinfect, or both clean and disinfect eyewear, depending on the type of treatment media used. The wipe compartment is positioned in the upper housing portion and designed to store wipes to be used by a user to dry treated eyewear. The wipes may be different types of wiping or drying objects, including tissues, towels, paper towels, towelettes, and other similar objects. The dispensing arrangement is positioned in the lower housing portion and operatively connected to the tank. The dispensing arrangement includes a pump and a nozzle that is positioned in and to partially project out of the lower housing portion and designed to dispense treatment media out of the housing. The control arrangement is positioned in the housing and designed to control the operation of the dispensing arrangement. The control arrangement includes a sensor that is designed and positioned to sense for the presence of eyewear under the nozzle. The control arrangement is designed to automatically activate the dispensing arrangement upon the sensor detecting the presence of eyewear under the nozzle to dispense treatment media out of the nozzle and onto eyewear positioned under the nozzle. The control arrangement is also designed to automatically deactivate the dispensing arrangement upon dispensing of a predetermined amount of treatment media, or upon the sensor not detecting the presence of eyewear under the nozzle.

In order to use the automatic eyewear treatment station, the housing is mounted to a wall or support structure with the upper housing portion of the housing positioned vertically higher than the lower housing portion of the housing. The wipe compartment is filled with wipes. The tank is filled with treatment media designed to clean, disinfect, or both clean and disinfect eyewear. The user then places the eyewear under the nozzle. The sensor detects the presence of eyewear under the nozzle with the sensor of the control arrangement and then automatically activates the dispensing arrangement, which dispenses treatment media out of the nozzle and onto the eyewear. Once a predetermined amount of treatment media is dispensed, or when the sensor does not detect the presence of eyewear under the nozzle, the control arrangement automatically deactivates the dispensing arrangement. The user can then manually wipe off the eyewear with the wipes.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
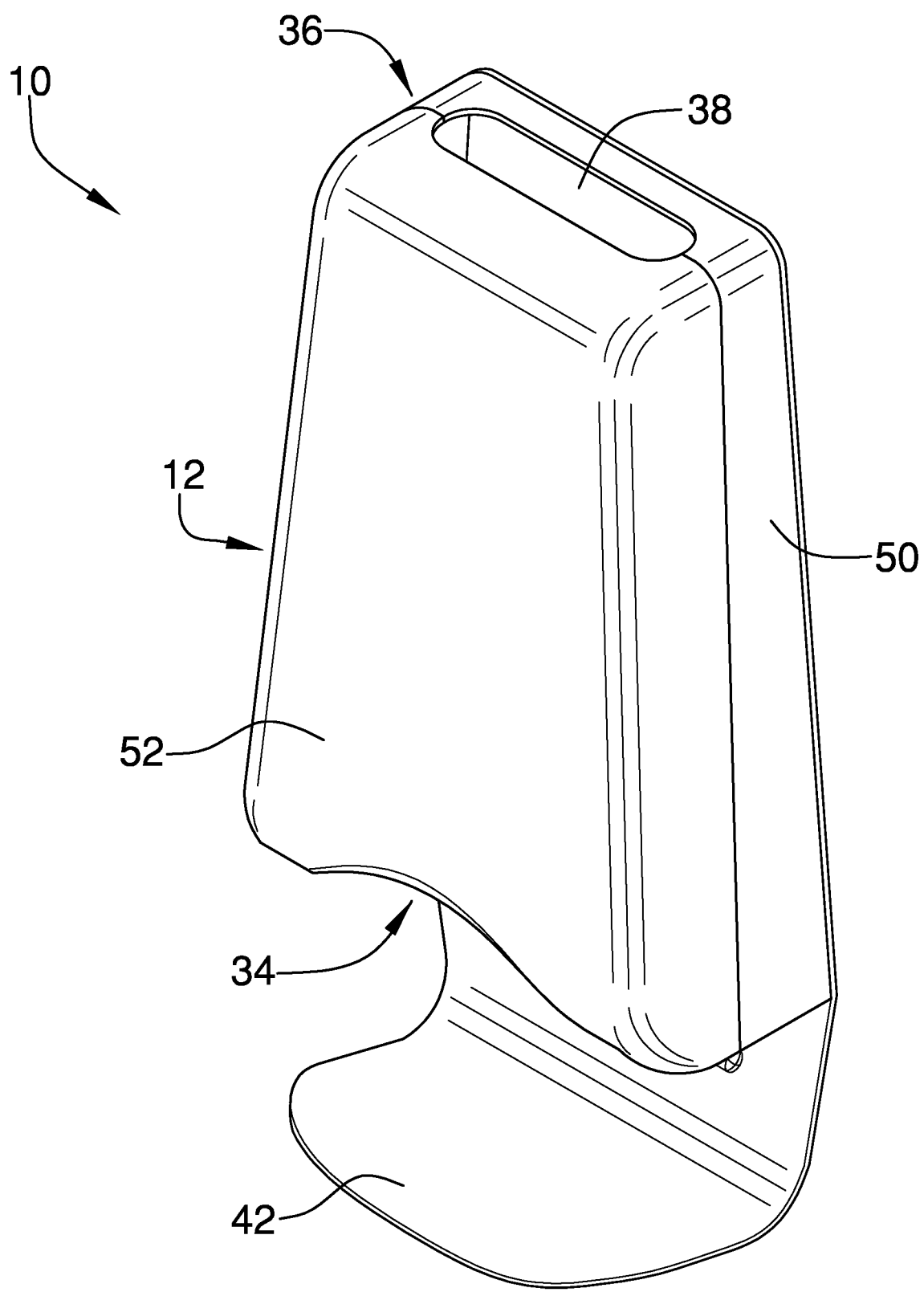
FIG. 1 is a front perspective view of an automatic eyewear treatment station according to an embodiment of the disclosure.
Figure 2:
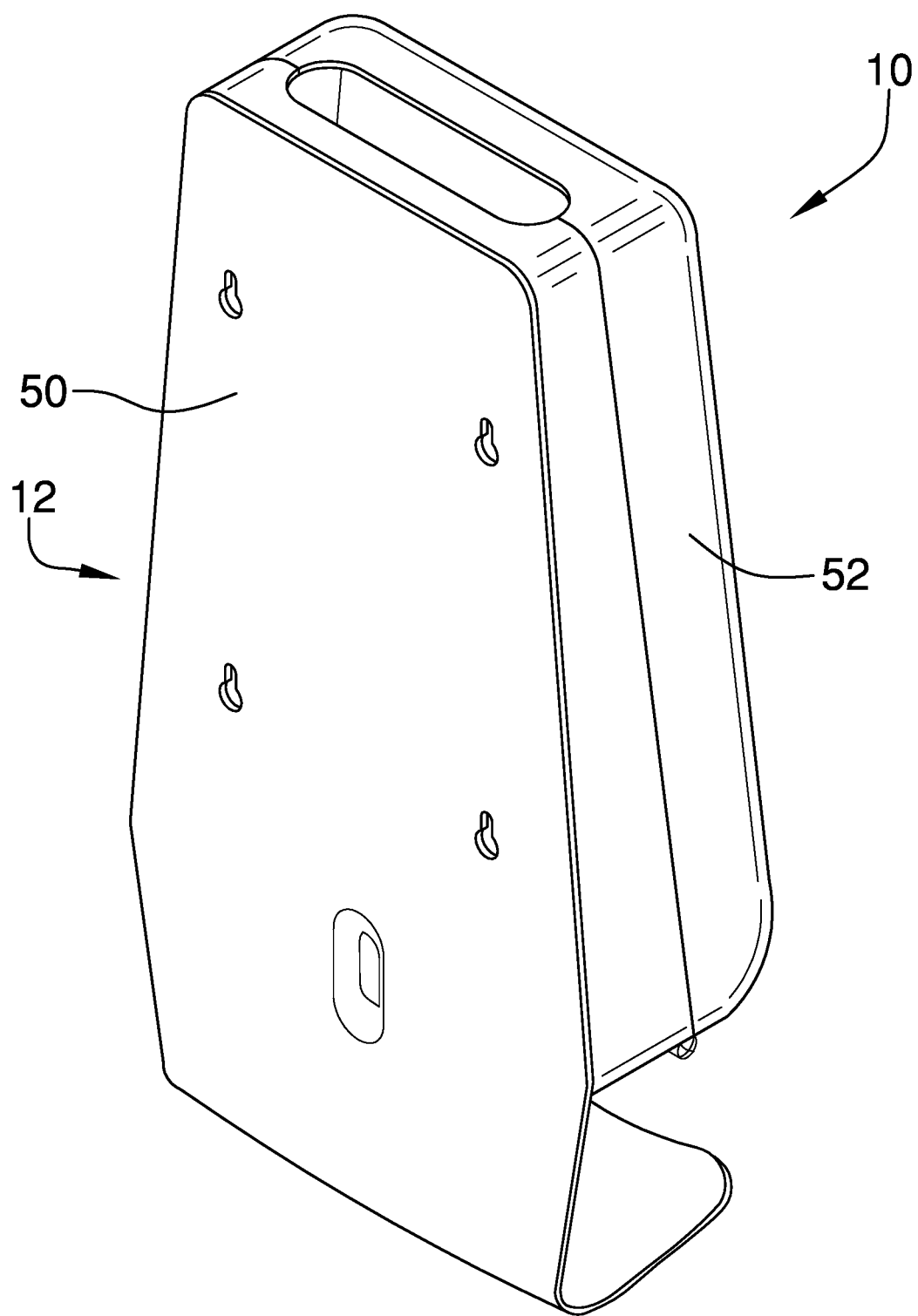
FIG. 2 is a rear perspective view of an embodiment of the disclosure.

With reference now to the drawings, and in particular to FIGS. 1 through 9 thereof, a new automatic eyewear treatment station embodying the principles and concepts of an embodiment of the disclosure and generally designated by the reference numeral 10 will be described.

Figure 3:
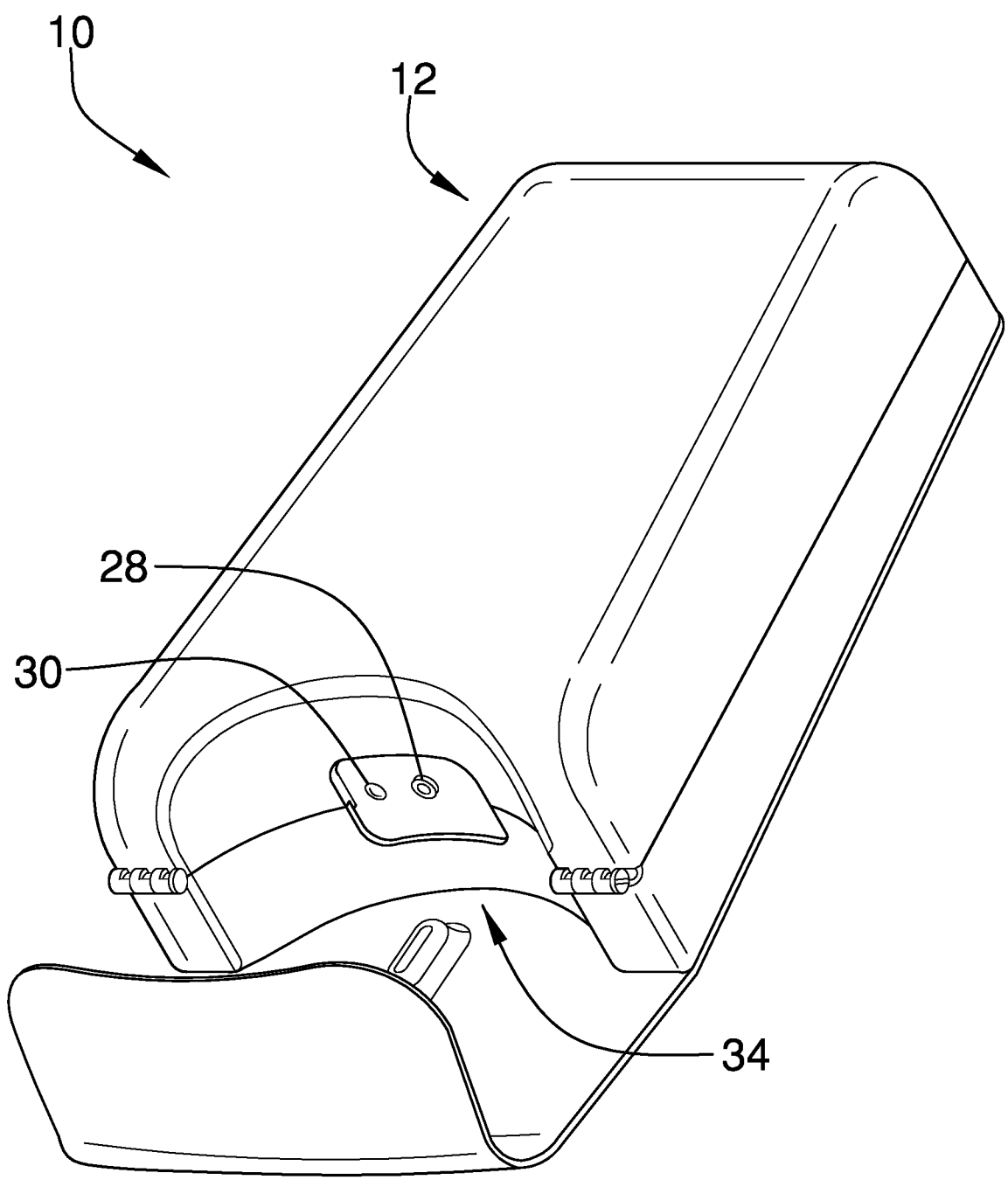
FIG. 3 is a front bottom perspective view of an embodiment of the disclosure.
Figure 4:
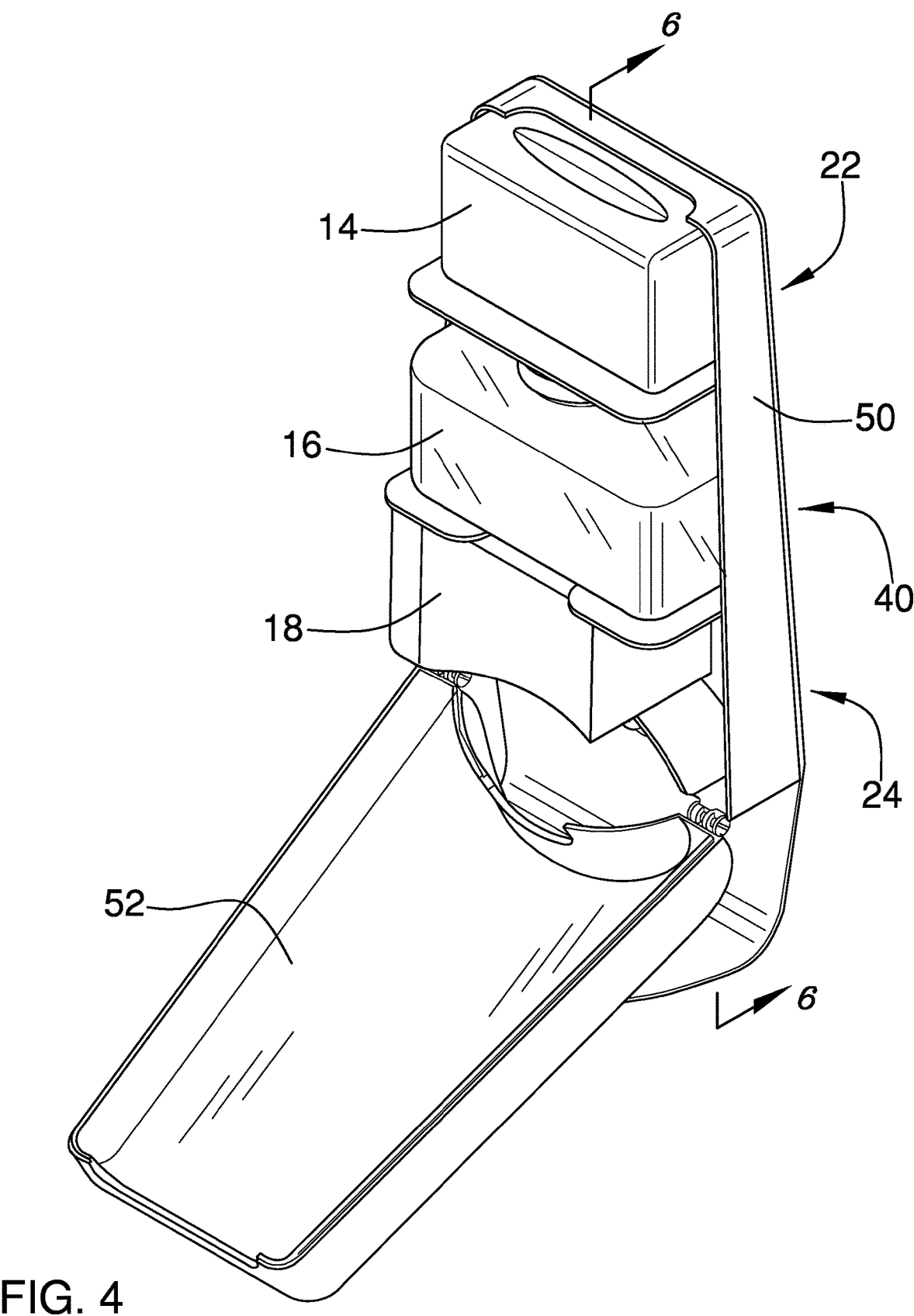
FIG. 4 is a front perspective view of an embodiment of the disclosure.

As best illustrated in FIGS. 1 through 9, the automatic eyewear treatment station 10 includes a housing 12, a wipe compartment 14, a tank 16, a dispensing arrangement 18, and a control arrangement 20. The housing 12 is designed to be mounted to a wall 70 (see FIG. 9) or support structure, such as a free-standing post or stanchion, with an upper housing portion 22 positioned vertically higher than a lower housing portion 24. The housing 12 includes a housing body 50 designed to be mounted to the wall 70 or support structure and a housing cover 52. As shown in FIG. 4, the housing cover 52 is pivotably attached to the housing body 50 to permit access to the interior of the housing 12 for refilling the automatic eyewear treatment station 10 or for performing maintenance.

Figure 5:
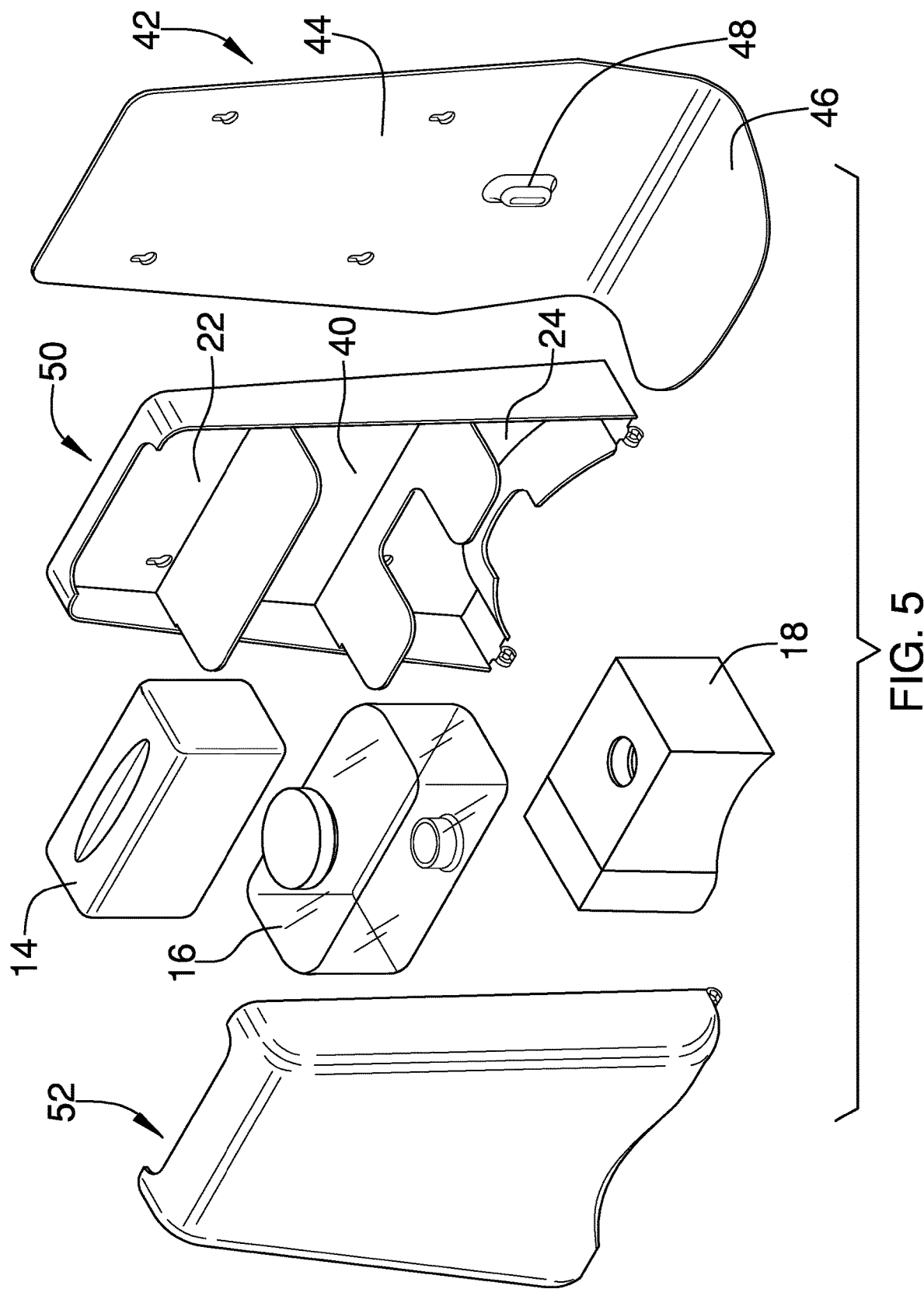
FIG. 5 is an exploded view of an embodiment of the disclosure.
Figure 6:
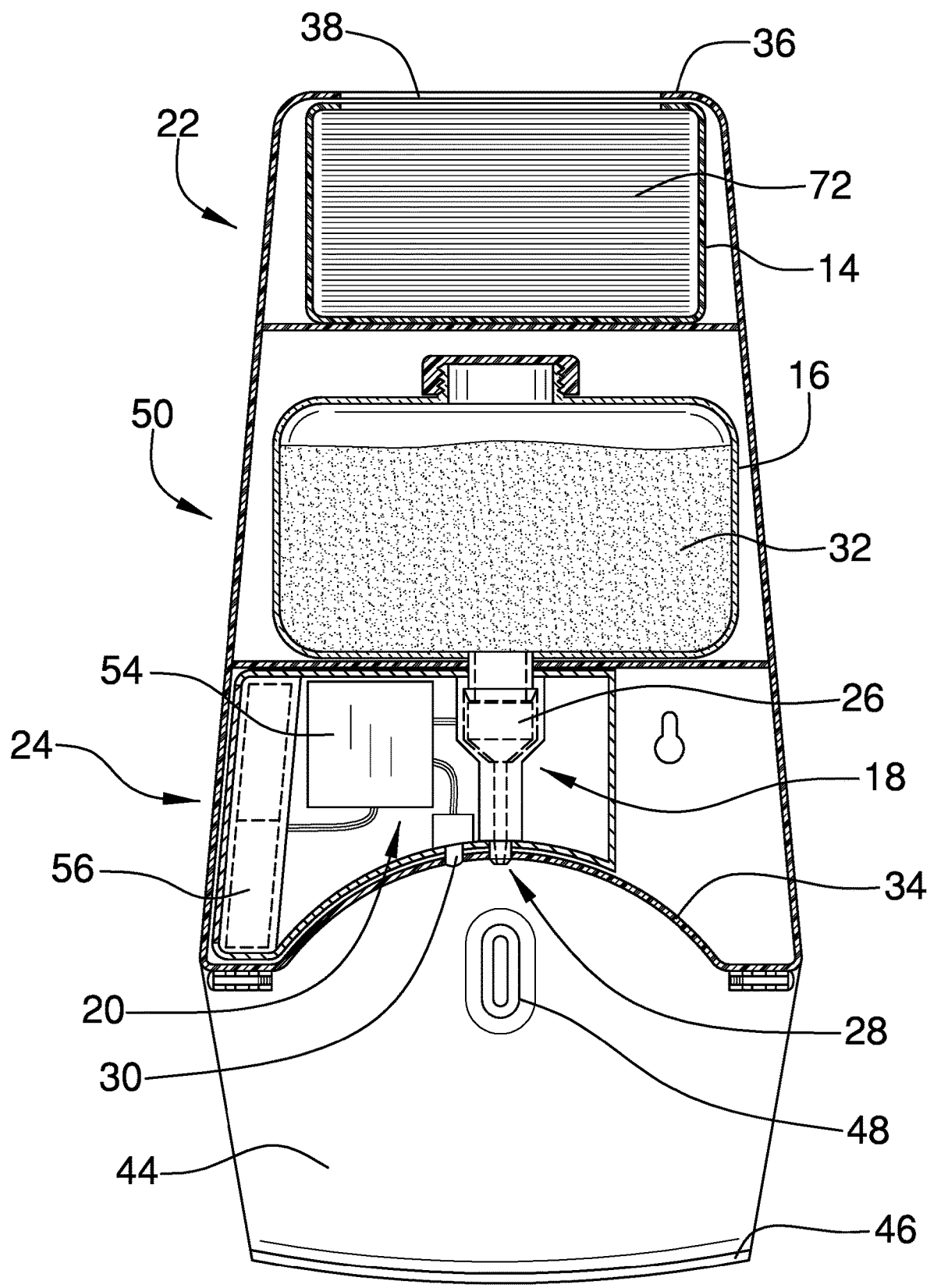
FIG. 6 is a cross-sectional view of an embodiment of the disclosure.
Figure 7:
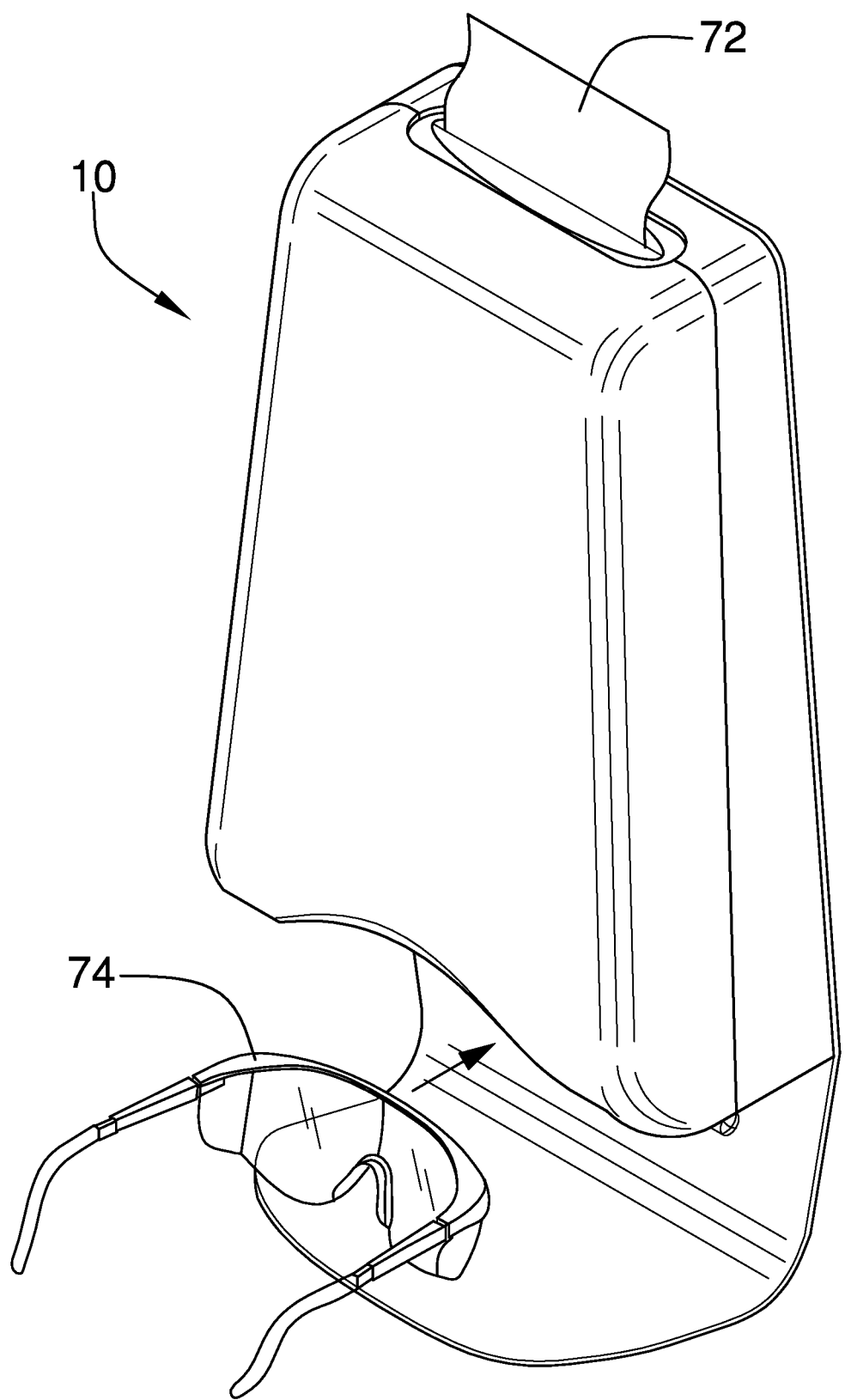
FIG. 7 is a front perspective view of an embodiment of the disclosure in use.
Figure 8:
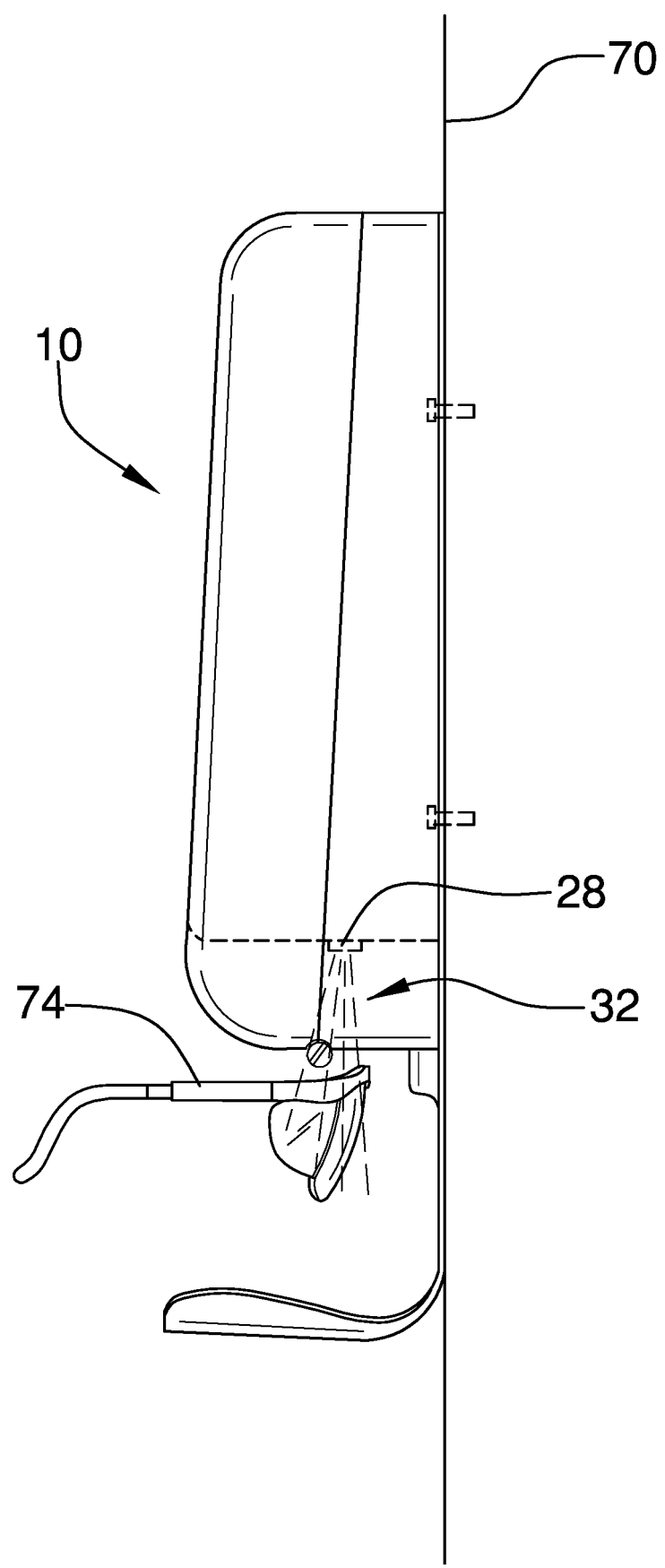
FIG. 8 is a side view of an embodiment of the disclosure in use.

With reference to FIGS. 4 through 6, the wipe compartment 14 is positioned in the upper housing portion 22 and designed to store wipes 72, which may include, for example, a box of tissues, towelettes, roll of paper towels, or similar disposable wiping or drying objects, to be used by a user to dry and further clean eyewear 74. The tank 16 is positioned in the housing 12 and designed to store treatment media to be used by a user to clean, disinfect, or both clean and disinfect eyewear 74, depending on the type of treatment media used. The treatment media includes a treatment solution 32 that includes cleaning media, disinfecting media, or a combination of cleaning and disinfecting media. As seen in FIG. 6, the tank 16 is positioned in a middle housing portion 40 between the lower housing portion 24 and the upper housing portion 22. Each of the housing portions 22, 24, and 40 may be designed as individual compartments.

The dispensing arrangement 18 is positioned in the lower housing portion 24 and is operatively connected to the tank 16. The dispensing arrangement 18 includes a pump 26 and a nozzle 28 that are positioned in and to partially project out of the lower housing portion 24 and designed to dispense treatment media out of the housing 12, as seen in FIGS. 3 and 6. The nozzle 28 is designed to dispense a mist or spray of the solution 32.

The control arrangement 20 is positioned in the housing 12 and designed to control the operation of the dispensing arrangement 18. The control arrangement 20 includes a sensor 30 that is designed and positioned to sense for the presence of eyewear 74 under the nozzle 28. The control arrangement 20 is designed to automatically activate the dispensing arrangement 18 upon the sensor 30 detecting the presence of eyewear 74 under the nozzle 28 to dispense treatment media out of the nozzle 28 and onto eyewear 74 positioned under the nozzle 28. The control arrangement 20 can be designed to automatically deactivate the dispensing arrangement 18 when a predetermined amount of treatment media has been dispensed. Alternatively, the control arrangement 20 can be designed to automatically deactivate the dispensing arrangement 18 when the sensor 30 does not detect the presence of eyewear 74 under the nozzle 28.

As seen in FIG. 6, the housing 12 can include a lower housing wall 34 that has a concave shape to help guide eyewear 74 to a centered position under the nozzle 28. This concave shape also can help to deflect and focus dispensed treatment media toward the eyewear 74. The nozzle 28 and the sensor 30 are positioned to project out through the lower housing wall 34. The housing 12 also includes a top housing wall 36 that includes a dispensing slot 38 to permit a user to withdraw the wipes 72 out through the dispensing slot 38.

The control arrangement 20 includes a microprocessor 54 and a battery power supply 56. The control arrangement 20 is programmable to detect and recognize eyewear 74 under the nozzle 28 and activate the dispensing arrangement 18 when only eyewear 74 is present under the nozzle 28 to minimize or prevent inadvertent activation of the dispensing arrangement 18 upon non-eyewear objects being present under the nozzle 28. In other words, the control arrangement 20 can be programmed to evaluate information received from the sensor 30 to determine if the detected object is an eyewear-like object or something else, such as a person's hand, and will only activate the dispensing arrangement 18 if eyewear 74 is detected.

The automatic eyewear treatment station 10 also includes a drip tray 42 positioned under the nozzle 28. As seen in FIG. 6, the drip tray 42 includes a connecting wall 44 connected to and positioned to extend downwardly from the lower housing portion 24. The drip tray 42 includes a collecting shelf 46 connected to and extending transversely from the connecting wall 44 (see FIG. 5). The drip tray 42 also includes an eyewear-centering projection 48 positioned to project out of a central area of the connecting wall 44. The eyewear-centering projection 48 can engage with a bridge portion of eyewear 74 to help center the eyewear 74 under the nozzle 28. The eyewear-centering projection 48 can also provide a visual guide to assist users in centering eyewear 74 under the nozzle 28 to promote optimum cleaning.

Figure 9:
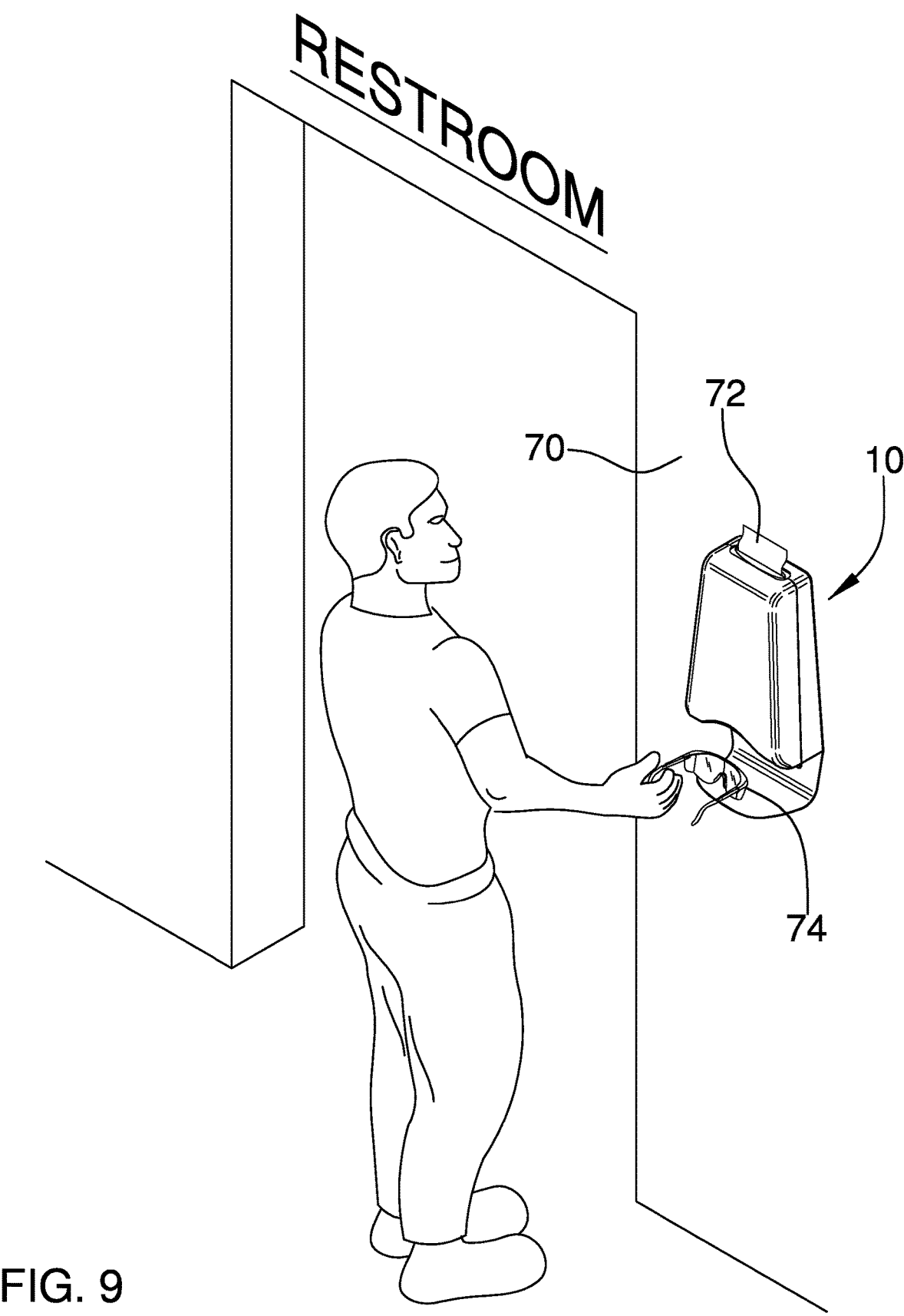
FIG. 9 is a front perspective view of an embodiment of the disclosure in use.

In order to use the automatic eyewear treatment station 10, the housing 12 is mounted to a wall 70 or support structure with the upper housing portion 22 of the housing 12 positioned vertically higher than the lower housing portion 24 of the housing 12. The wipe compartment 14 is filled with a box of wipes 72. The tank 16 is filled with treatment media designed to clean, disinfect, or both clean and disinfect the eyewear 74. The user then places the eyewear 74, such as safety glasses, under the nozzle 28. FIG. 9 shows an example of a person cleaning his safety goggles for hygienic reasons after using the restroom. When placing the eyewear 74 under the nozzle 28, the user can also visually or mechanically align a bridge portion of the eyewear 74 with the eyewear-centering projection 48 to place the eyewear 74 in a centered position under the nozzle 28.

The sensor 30 then detects the presence of eyewear 74 under the nozzle 28 with the sensor 30 of the control arrangement 20 and then automatically activates the dispensing arrangement 18, which dispenses treatment media out of the nozzle 28 and onto the eyewear 74, such as by spraying a mist of treatment solution that includes cleaning media, disinfecting media, or a combination of cleaning media and disinfecting media. In one possible embodiment, the control arrangement 20 activates the dispensing arrangement 18 when only eyewear 74 is present under the nozzle 28. Once a predetermined amount of treatment media is dispensed or the sensor 30 does not detect the presence of eyewear 74 under the nozzle 28, depending on the programming of the control arrangement 20, the control arrangement 20 automatically deactivates the dispensing arrangement 18. The user can then withdraw the wipes 72 through the dispensing slot 38 and manually wipe off the eyewear 74 with the wipes 72. The drip tray 42 collects treatment solution 32 sprayed past or dripping off of the eyewear 74.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automatic eyewear treatment station comprising:
    a housing mountable to a wall or support structure with an upper housing portion disposed vertically higher than a lower housing portion;
    a tank being disposed in said housing and configured to store treatment media to be used by a user to treat eyewear;
    a wipe compartment being disposed in said upper housing portion and configured to store wipes to be used by a user to dry treated eyewear;
    a dispensing arrangement being disposed in said lower housing portion and operatively connected to said tank;
    said dispensing arrangement comprising a pump and a nozzle being disposed in and to partially project out of said lower housing portion and configured to dispense treatment media out of said housing;
    a control arrangement being disposed in said housing and configured to control the operation of said dispensing arrangement;
    said control arrangement comprising a sensor being configured and disposed to sense for the presence of eyewear under said nozzle; and
    said control arrangement being configured to automatically activate said dispensing arrangement upon said sensor detecting the presence of eyewear under said nozzle to dispense treatment media out of said nozzle and onto eyewear disposed under said nozzle and to automatically deactivate said dispensing arrangement upon dispensing of a predetermined amount of treatment media or upon said sensor not detecting the presence of eyewear under said nozzle.

2. The automatic eyewear treatment station of claim 1, wherein:
    said treatment media comprises a treatment solution comprising at least one of cleaning media and disinfecting media; and
    said nozzle is configured to dispense a mist of treatment solution.

3. The automatic eyewear treatment station of claim 2, wherein said housing comprises a lower housing wall having a concave shape to help guide eyewear to a centered position under said nozzle and deflect and focus dispensed treatment media.

4. The automatic eyewear treatment station of claim 3, wherein said nozzle and said sensor are disposed to project out through said lower housing wall.

5. The automatic eyewear treatment station of claim 4, wherein:
    said housing comprises a top housing wall that comprises a dispensing slot to permit a user to withdraw wipes out through said dispensing slot; and
    said tank is disposed in a middle housing portion between said lower housing portion and said upper housing portion.

6. The automatic eyewear treatment station of claim 5, further comprising a drip tray disposed under said nozzle, wherein:
    said drip tray comprises a connecting wall connected to and disposed to extend downwardly from said lower housing portion;
    said drip tray comprises a collecting shelf connected to and extending transversely from said connecting wall; and
    said drip tray comprises an eyewear-centering projection disposed to project out of a central area of said connecting wall and configured to engage with a bridge portion of eyewear to center eyewear under said nozzle and to provide a visual guide to assist users in centering eyewear under said nozzle to promote optimum cleaning.

7. The automatic eyewear treatment station of claim 6, wherein said housing comprises a housing body configured to be mounted to a wall or support structure and a housing cover pivotably attached to said housing body to permit access to the interior of said housing to at least one of refill the automatic eyewear treatment station and perform maintenance.

8. The automatic eyewear treatment station of claim 7, wherein:
    said control arrangement comprises a microprocessor and a battery power supply; and
    said control arrangement is programmable to detect and recognize eyewear under said nozzle and activate said dispensing arrangement upon only eyewear being present under said nozzle to minimize or prevent inadvertent activation of said dispensing arrangement upon non-eyewear objects being present under said nozzle.

9. The automatic eyewear treatment station of claim 1, wherein said housing comprises a lower housing wall having a concave shape to help guide eyewear to a centered position under said nozzle and deflect and focus dispensed treatment media.

10. The automatic eyewear treatment station of claim 9, wherein said nozzle and said sensor are disposed to project out through said lower housing wall.

11. The automatic eyewear treatment station of claim 1, wherein:
- said housing comprises a top housing wall that comprises a dispensing slot to permit a user to withdraw wipes out through said dispensing slot; and
- said tank is disposed in a middle housing portion between said lower housing portion and said upper housing portion.

12. The automatic eyewear treatment station of claim 1, further comprising a drip tray disposed under said nozzle, wherein:
- said drip tray comprises a connecting wall connected to and disposed to extend downwardly from said lower housing portion;
- said drip tray comprises a collecting shelf connected to and extending transversely from said connecting wall; and
- said drip tray comprises an eyewear-centering projection disposed to project out of a central area of said connecting wall and configured to engage with a bridge portion of eyewear to center eyewear under said nozzle and to provide a visual guide to assist users in centering eyewear under said nozzle to promote optimum cleaning.

* * * * *